(12) United States Patent
Aggour et al.

(10) Patent No.: US 8,126,790 B2
(45) Date of Patent: Feb. 28, 2012

(54) SYSTEM FOR COST-SENSITIVE AUTONOMOUS INFORMATION RETRIEVAL AND EXTRACTION

(75) Inventors: Kareem Sherif Aggour, Niskayuna, NY (US); John Alan Interrante, Scotia, NY (US); Christina Ann LaComb, Schenectady, NY (US); Abha Moitra, Scotia, NY (US); Ibrahim Gokcen, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1123 days.

(21) Appl. No.: 11/552,538

(22) Filed: Oct. 25, 2006

(65) Prior Publication Data

US 2008/0195463 A1 Aug. 14, 2008

(51) Int. Cl.
*G06Q 40/00* (2006.01)
*G06F 7/00* (2006.01)
(52) U.S. Cl. ........... 705/35; 707/706; 707/707; 707/754
(58) Field of Classification Search .................. None
See application file for complete search history.

(56) References Cited

U.S. PATENT DOCUMENTS

| 2005/0154701 | A1* | 7/2005 | Parunak et al. .................. 707/1 |
| 2005/0222929 | A1 | 10/2005 | Steier et al. |
| 2006/0004866 | A1 | 1/2006 | Lawrence et al. |

OTHER PUBLICATIONS

K. Fanning et al., Detection of Management Fraud: A Neutral Network Approach, IEEE, 1995, pp. 220-223.
T. Kwon et al., "A Multilayered Perceptron Approach to Prediction of the SEC's Investigation Targets," IEEE Transactions on Neutral Networks, vol. 7, No. 5, Sep. 1996, pp. 1286-1290.
K. Sycara et al., "Distributed Intelligent Agents," 1996, www.cs.cmu.edu/~softagents/ pp. 1-32.
K. L. Clark et al., "A Multi-Agent system for Distributed Information Retrieval on the World Wide Web," Proceedings Sixth IEEE Workshop on Enabling Technologies: Infrastructure for Collaborative Enterprises, 1997, pp. 87-92.
R. L. Popp et al., "Efficient Information Retrieval on the World Wide Web Using Adaptable and Mobile Java Agents," IEEE International Conference on Systems, Man, and Cybernetics, vol. 3, 1998, pp. 2219-2224.
V. Lesser et al., "BIG: A Resource-Bounded Information Gathering and Decision Support Agent," UMass computer Science Technical Report 1998-52, pp. 1-34.
J. Yang et al., "Intelligent Mobile Agents for Information Retrieval and Knowledge Discovery from Distributed Data and Knowledge Sources," IEEE, 1998, pp. 99-102.
Y. Yang et al., "Learning Approaches for Detecting and Tracking News Events," IEEE Intelligent Systems and Their Applications, 1999, pp. 32-43.

(Continued)

*Primary Examiner* — Charles Kyle
*Assistant Examiner* — Irene Kang
(74) *Attorney, Agent, or Firm* — Scott J. Asmus (57) ABSTRACT

A multi-agent system is provided for automatically acquiring desired information from one or more information sources. The multi-agent system includes a plurality of data provider filter agents associated with the one or more information sources. The data provider filter agents are configured to search for the desired information within the respective information sources based on an assessment of the one or more information sources. The multi-agent system also includes a content extraction agent configured to acquire a plurality of articles containing the desired information from the one or more information sources based on the search.

1 Claim, 4 Drawing Sheets

OTHER PUBLICATIONS

S. Cazalens et al., "A Multi-Agent System for Internet Information Retrieval," Research Report May 2000, No. 3, 12 pages.

S. Scholz et al., "Managing the Context Issues of Non-Financial Accounting Information on the Internet: An Intelligent Agent Approach," Proceedings of the 33rd Hawaii International Conference on System Sciences 2000, 8 pages.

L. M. Deschaine et al., "Use of InfoSleuth to Coordinate Information Acquisition, Tracking and Analysis in Complex Applications," Technical Report MCC-INSL-008-00, 2000, 6 pages.

A. Kloptchenko et al., "Combining Data and Text Mining Techniques for Analyzing Financial Reports," Eighth Americas Conference on Information Systems, 2000, pp. 20-28.

A. Kloptchenko et al., "A Conceptual Model for a Multiagent Knowledge Building System," Turku Centre for Computer Science and IAMSR, pp. 223-228.

Christina Ann LaComb et al., "System, Method and C Omputer Product to Detect Behavorial Patterns Related to the Finalcial Health of a Business Entity," U.S. Appl. No. 10/719,953, filed Nov. 21, 2003.

Michael J. North et al., "Experiences Creating Three Implementations of the Repast Agent Modeling Toolkit," ACM Transactions on Modeling and Computer Simulation, vol. 16, No. 1, Jan. 2006, pp. 1-25.

K. Fanning et al., Neural Network Detection of Management Fraud Using Published Financial Data, http://peakconsulting.com/ijis3.pdf., 55 pages.

* cited by examiner

SYSTEM FOR COST-SENSITIVE AUTONOMOUS INFORMATION RETRIEVAL AND EXTRACTION

BACKGROUND

The invention relates generally to information retrieval, and more specifically to a technique for automatically and intelligently retrieving information. In particular, the invention relates to gathering information about business entities or industries by retrieving information on newsworthy events.

A wide variety of applications require data mining across multiple information sources. For example, monitoring customer business risk is a critical element of the corporate lending process, both to assess the repayment risk of new loan customers and to monitor the repayment risk of current customers. There are several commercially available tools that permit financial analysts to monitor the financial health of a business entity by analyzing its publicly available financial data. Typically, these tools utilize quantitative financial data to generate risk scores indicative of the financial health of the business entity. Examples of quantitative financial information include financial statement reports, stock price and volume, credit and debt ratings and risk scores related to the business entity.

However, the quantitative data does not provide all of the information that is pertinent to customer risk. Moreover, since quantitative financial data is typically generated quarterly, the tools do not take into account other forms of information such as events related to the business entity that may indicate business risk and that may arise between financial statement reports. For example, these tools do not consider qualitative business event information that may arise before the release of a financial statement such as government investigations, management transitions, debt restructuring, or an entity losing several significant customers. Such business events also have considerable bearing on the overall risk of the business. Events outside of the business, such as government regulatory changes and industry events, also impact business risk. Additionally, these tools generate risk scores with the assumption that the financial statement used to generate the score is accurate.

In order to account for the disadvantages associated with the above tools, financial analysts typically monitor qualitative and quantitative business event information related to a business entity or industry through the use of forensic accounting techniques. Qualitative and quantitative business event information includes, for example, business event data that reflect certain behavioral symptoms or catalysts of financial stress associated with the business entity such as executive staff changes or accountant changes. The forensic accounting techniques determine financial inconsistencies related to a business entity through on-site audits of company books, interactive data mining of commercial databases, analyzing information in publicly available sources, surveying of financial notes related to the business entity, interviews with executive teams, and assessment of accounting standards and control systems. In particular, financial analysts manually read through business, industry and trade news publications for intelligence gathering of qualitative business event information that relates to a business entity and then use their judgment to predict the business risk of the entity. Effective intelligence gathering typically requires the extraction and assimilation of information from an extensive and diverse set of information sources. This often includes collecting and integrating both historical and current information from multiple data providers.

For example, in order to effectively assess the health of a business entity, information sources must be accessed and mined for relevant information, and then the information must be assimilated. This can include reviewing financial statements, financial footnotes, news (such as announcements of new product offerings or pending litigation), press releases, insider trading data, 8-K events of material significance, analyst commentaries, commercial credit ratings, and stock price data. Some and perhaps all of this information may be required to perform an effective analysis of a business entity's historical performance and current state of health. Additionally, if the business entity or industry is subject to ongoing monitoring, new information must be collected proactively. Along with the information collection, if information of sufficient significance is found, it may require a human be notified to then take additional action.

This manual process of collecting and analyzing qualitative business event information is traditionally ad hoc in both its methodology and coverage, and may result in significant delays or completely missing events of importance and missed recognition of trends that indicate overall business risk. Moreover, this process is very time consuming, especially with the increasing amount of information available on the Internet and in other media. Further, multiple heterogeneous data sources have to be accessed and monitored for both historical and current information. There is no single source of all of the potentially relevant information, and so this information must be gathered from different locations and, as a consequence, in different formats. Thus, the fusion and collection of such vast amounts of information is not standardized, not subject to the rigor of statistical analysis, and is not scalable. Moreover, it is desirable to support adding new sources (and possibly removing old ones) over time, as new information sources are found or become available and old ones become obsolete.

Additionally, when evaluating the health of a large portfolio or an entire industry, it quickly becomes cost-prohibitive to capture all of the information on all of the companies in the portfolio or industry. Any experienced credit analyst recognizes that certain information is only needed in certain situations. For example, a lender may only consider it necessary to examine insider trading patterns for companies that are exhibiting a deteriorating operational cash flow position for which the lender has extensive exposure. For other companies, such as those where the exposure is low and the financials are otherwise strong, the time and effort to collect and utilize this information is simply not cost-effective. Additionally, it is also important to choose a suitable data provider based on its strengths for each type of information required. For example, if a lender requires information regarding recent CEO changes for a company, this information may be acquired from low-cost sources such as the Wall Street Journal, or from a significantly more expensive product from Factiva. Currently, financial analysts assess the data sources available, subjectively weigh the pros/cons of each provider (or combinations of providers), and then purchase those sources which seem the best suited. Further, each department within the same organization separately purchases and collects often very similar information leading to redundancies and overspending.

Many attempts have been made to automate the process of collecting this type of data. However, the current techniques build separate automation operations specific to each provider to automate the process of collecting the data. Further, a separate automated system may be required to fuse the information. Additionally, none of the current techniques deals with fee-based sources for data mining or demonstrate the ability to work within cost constraints. Typically, natural language processing (NLP) techniques are being used to identify specific word patterns in news articles, press releases, and financial footnotes to help automate the extraction of materially relevant events. Text-mining software may use these NLP techniques to search textual sources for events such as CEO and auditor changes. However, the technology is considerably less effective than a human at understanding the breadth of information relayed in text, due in large part to the complexities of the English language and the many ways in which ideas can be expressed. Thus, an information extraction system has difficulty understanding the limitless ways in which concepts can be expressed in the English language.

It is therefore desirable to provide a cost-effective and efficient technique for automatically retrieving relevant and useful information from diverse information sources. It is also desirable to provide a deliberative learning technique for intelligent information retrieval. Additionally, it is desirable to provide a technique for fusing and collecting such vast amounts of information in a standardized manner so as to analyze the information.

BRIEF DESCRIPTION

Briefly, in accordance with one aspect of the technique, a multi-agent system is provided for automatically acquiring desired information from one or more information sources. The multi-agent system includes a plurality of data provider filter agents associated with the one or more information sources. The data provider filter agents are configured to search for the desired information within the respective information sources based on an assessment of the one or more information sources. The multi-agent system also includes a content extraction agent configured to acquire a plurality of articles containing the desired information from the one or more information sources based on the search.

In accordance with another aspect of the technique, a system is provided for assessing the health of a business entity or an industry. The system includes a multi-agent system for automatically retrieving a plurality of articles from one or more information sources based on an assessment of the one or more information sources and for extracting one or more business events of interest related to the business entity or the industry from the plurality of articles. The system also includes an assessment subsystem for assessing the health of the business entity or the industry based on the one or more business events of interest.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are generally directed to automatically and intelligently retrieving useful information from diverse information sources and to analyzing the retrieved information. Such retrieval and analytic techniques may be useful in monitoring and evaluating a variety of datasets, such as financial datasets, demographic datasets, behavioral datasets, census datasets and so forth. Though the present discussion provides examples in context of financial and business event data, one of ordinary skill in the art will readily apprehend that the application of these techniques in other contexts is well within the scope of the present techniques.

Figure 1:
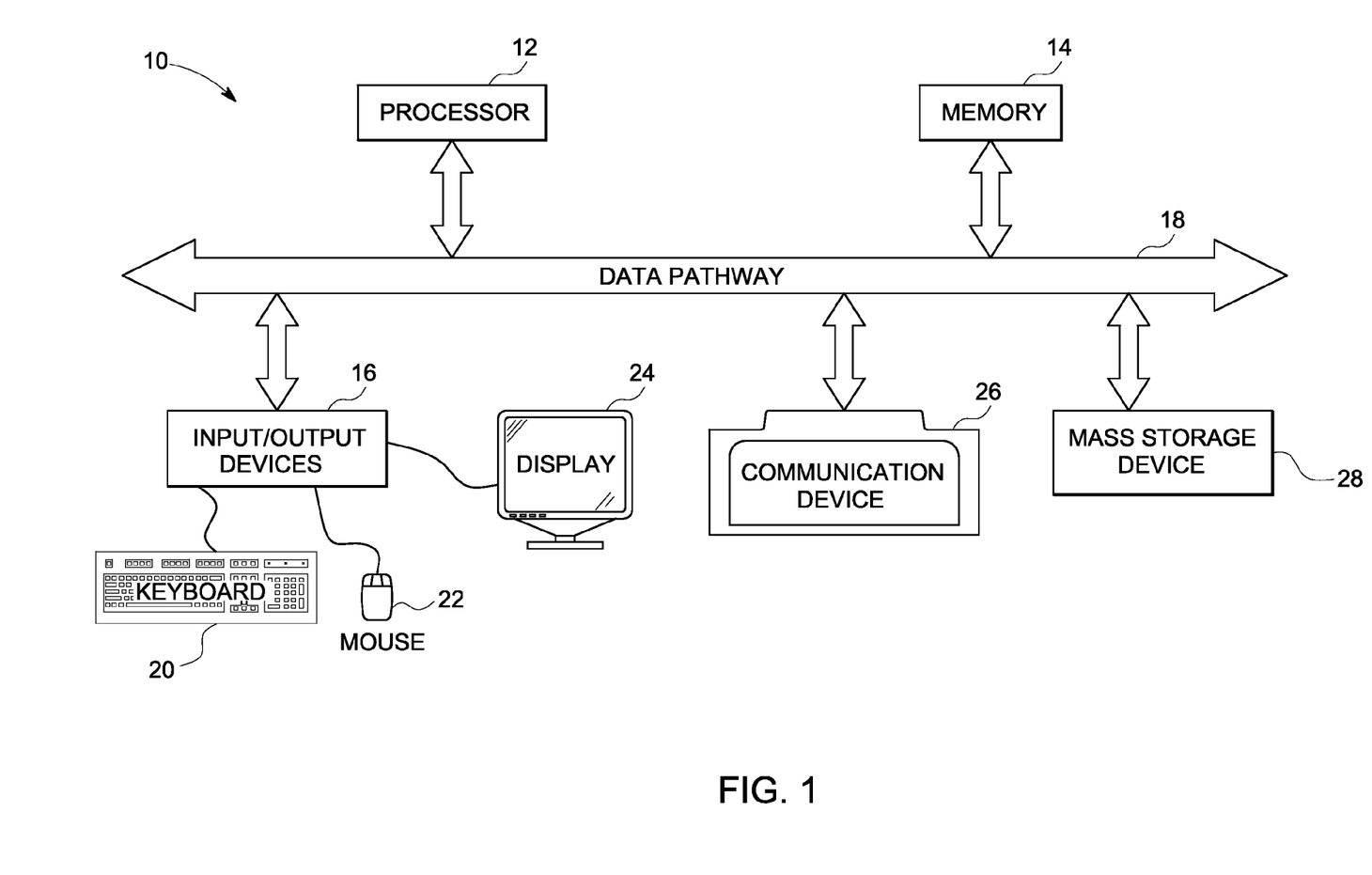
FIG. 1 is a schematic of a general-purpose computer system for acquiring desired information from diverse information sources and analyzing the same in accordance with aspects of the present technique.

Referring now to FIG. 1, a schematic diagram of a general-purpose computer system 10 is illustrated in accordance with aspects of the present technique. The computer system 10 is configured to automatically and intelligently retrieve useful information from diverse information sources and to analyze the retrieved information for various purposes, such as for assessing the health of a business entity. The computer system 10 generally includes a processor 12, a memory 14, and input/output devices 16 connected via a data pathway (e.g., buses) 18.

The processor 12 accepts instructions and data from the memory 14 and performs various data processing functions of the system, such as acquiring information related to an entity from the diverse information sources, extracting one or more events of interest from the acquired information, and performing analytics on the extracted events. The processor 12 includes an arithmetic logic unit (ALU) that performs arithmetic and logical operations, and a control unit that extracts instructions from memory 14 and decodes and executes them, calling on the ALU when necessary. The memory 14 stores a variety of data computed by the various data processing functions of the system 10. The data may include, for example, quantitative and qualitative data, such as financial measures and ratios, commercially available rating scores, or business event information related to a business entity. The memory 14 generally includes a random-access memory (RAM) and a read-only memory (ROM); however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices. The information in the memory 14 might be conveyed to a human user through the input/output devices 16, the data pathway 18, or in some other suitable manner.

The input/output devices 16 may further include a keyboard 20 and a mouse 22 that a user can use to enter data and instructions into the computer system 10. Additionally, a display 24 may be used to allow a user to see what the computer has accomplished. Other output devices may include a printer, plotter, synthesizer and speakers. The computer system 10 may further include a communication device 26 such as a telephone, cable or wireless modem or a network card such as an Ethernet adapter, local area network (LAN) adapter, integrated services digital network (ISDN) adapter, or Digital Subscriber Line (DSL) adapter, that enables the computer system 10 to access other computers and resources on a network such as a LAN or a wide area network (WAN). The computer system 10 may also include a mass storage device 28 to allow the computer system 10 to retain large amounts of data permanently. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 may take the form of a hand-held digital computer, personal digital assistant computer, notebook computer, personal computer, workstation, mini-computer, mainframe computer or supercomputer.

As will be appreciated by one skilled in the art, a variety of techniques may be employed to acquire and analyze information of interest from diverse information sources. For example, the exemplary computer system 10 may acquire desired information from the diverse information sources, extract relevant events from the acquired information, and analyze the extracted events by the techniques discussed herein. In particular, as will be appreciated by those of ordinary skill in the art, control logic and/or automated routines for performing the techniques and steps described herein may be implemented by the computer system 10, either by hardware, software, or combinations of hardware and software. For example, suitable code may be accessed and executed by the processor 12 to perform some or all of the techniques described herein. Similarly application specific integrated circuits (ASICs) configured to perform some or all of the techniques described herein may be included in the processor 12.

Figure 2:
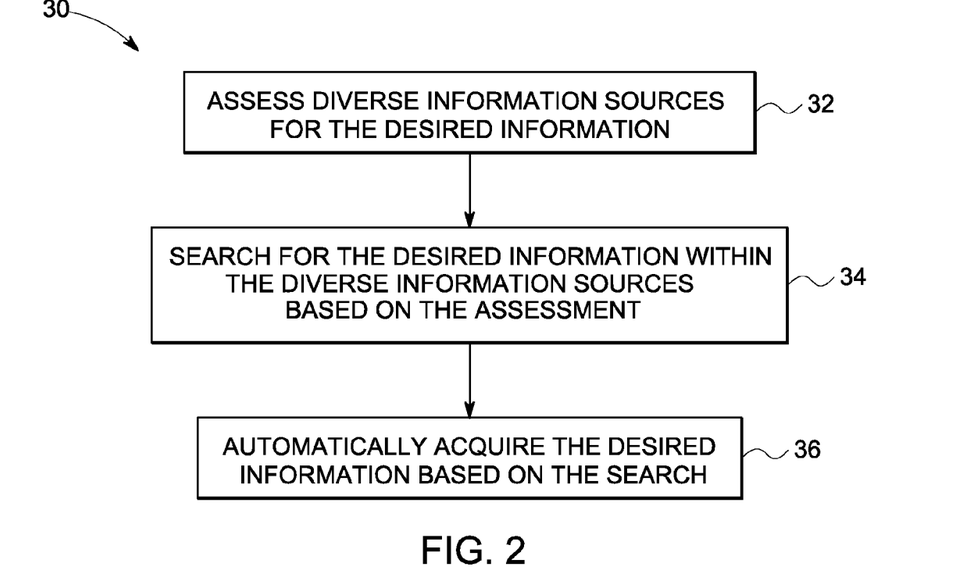
FIG. 2 is a flowchart depicting a process for acquiring information of interest from diverse information sources in accordance with aspects of the present technique.

For example, referring now to FIG. 2, exemplary control logic 30 for acquiring information of interest from diverse information sources via an information acquisition and analysis system, such as computer system 10, is depicted via a flowchart in accordance with aspects of the present technique. As illustrated in the flowchart, exemplary control logic 30 includes the steps of assessing diverse information sources for the desired information at step 32, searching for the desired information within the diverse information sources based on the assessment at step 34, and automatically acquiring the desired information based on the search at step 36.

As will be appreciated by one skilled in the art, the diverse information sources 58 may include, but are not limited to, news aggregators such as Factiva, press releases, government regulatory sites (e.g., www.sec.gov), newspapers, news sites and so forth. The diverse information sources are assessed by determining a potential value of the desired information, a probability of the desired information to be contained in each of the diverse information sources, and/or a potential cost to acquire the desired information from the diverse information sources. It should be noted that the goal of the assessment is to maximize the amount and the relevancy (value) of the information acquired from the diverse information sources while minimizing the cost of acquisition. Additionally, the assessment of the diverse information sources is based on the outcomes of previous acquisitions or assessments. Thus, the exemplary control logic 30 may further include the step of updating knowledge about the diverse information sources based on the assessment.

As will be appreciated by one skilled in the art, the desired information is acquired from the diverse information sources and then restructured into a standard or consistent format even though the type and format of the raw information from the different information sources may be different. The information sources provide raw data that requires reformatting into a common structure for storage and later use. As will be appreciated by one skilled in the art, there are many different ways to structure the same information. A standard format makes storing the information for later retrieval possible and provides a common structure to use the information throughout the system. The standard format contains several elements, including event type, company, event source, and event date. These fields are extracted from the raw content pulled from the diverse information sources, and are then stored in a structured way such that a user can query the information in different ways (by company, date, event category, etc.). The structured format's usefulness is that it enables the user to integrate information from different sources (e.g., display both quantitative and qualitative information on a company integrated in a user interface). Additionally, the structured format enables the user to automatically parse the extracted information, to be used in an automated company health monitoring system.

Figure 3:
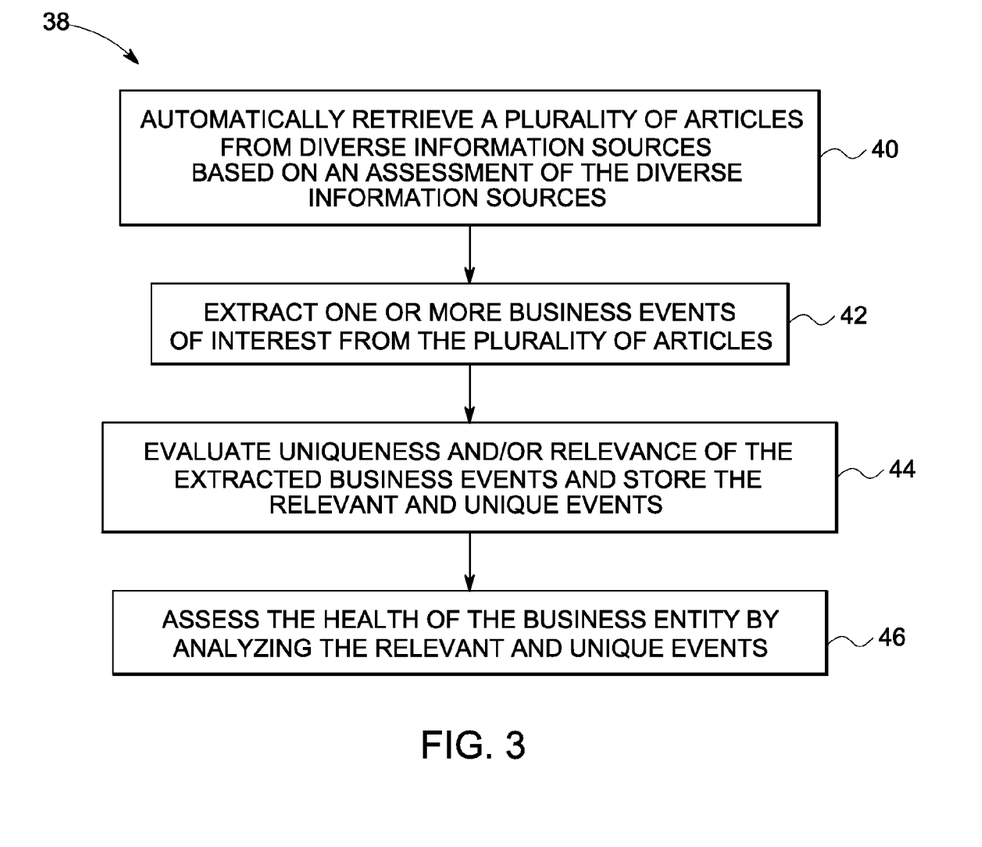
FIG. 3 is a flowchart depicting a process for assessing the health of a business entity in accordance with aspects of the present technique.

In certain embodiments, the desired information comprises quantitative and/or qualitative information related to a business entity. As will be appreciated by one skilled in the art, the quantitative and/or qualitative information is analyzed to monitor the health of the business entity. For example, referring now to FIG. 3, exemplary control logic 38 for assessing the health of a business entity via an information acquisition and analysis system, such as computer system 10, is depicted via a flowchart in accordance with aspects of the present technique. As illustrated in the flowchart, exemplary control logic 38 includes the step of automatically retrieving a plurality of articles from diverse information sources based on the assessment of the diverse information sources at step 40. The assessment of the diverse information sources may be performed as described above. As will be appreciated by one skilled in the art, in certain embodiments, the plurality of articles may be automatically retrieved by proactively identifying and retrieving articles of interest from the diverse information sources. Alternatively, the plurality of articles may be retrieved from the diverse information sources in response to a request by a user. It should be noted that each of the plurality of articles might include business event information related to the business entity. The exemplary control logic 38 further includes the steps of extracting one or more business events of interest from the plurality of articles at step 42, evaluating uniqueness and/or relevance of the extracted business events and storing the relevant and unique events at step 44, and assessing the health of the business entity by analyzing the relevant and unique events at step 46. Various steps of the exemplary control logic 38 will be described in greater detail below.

Figure 4:
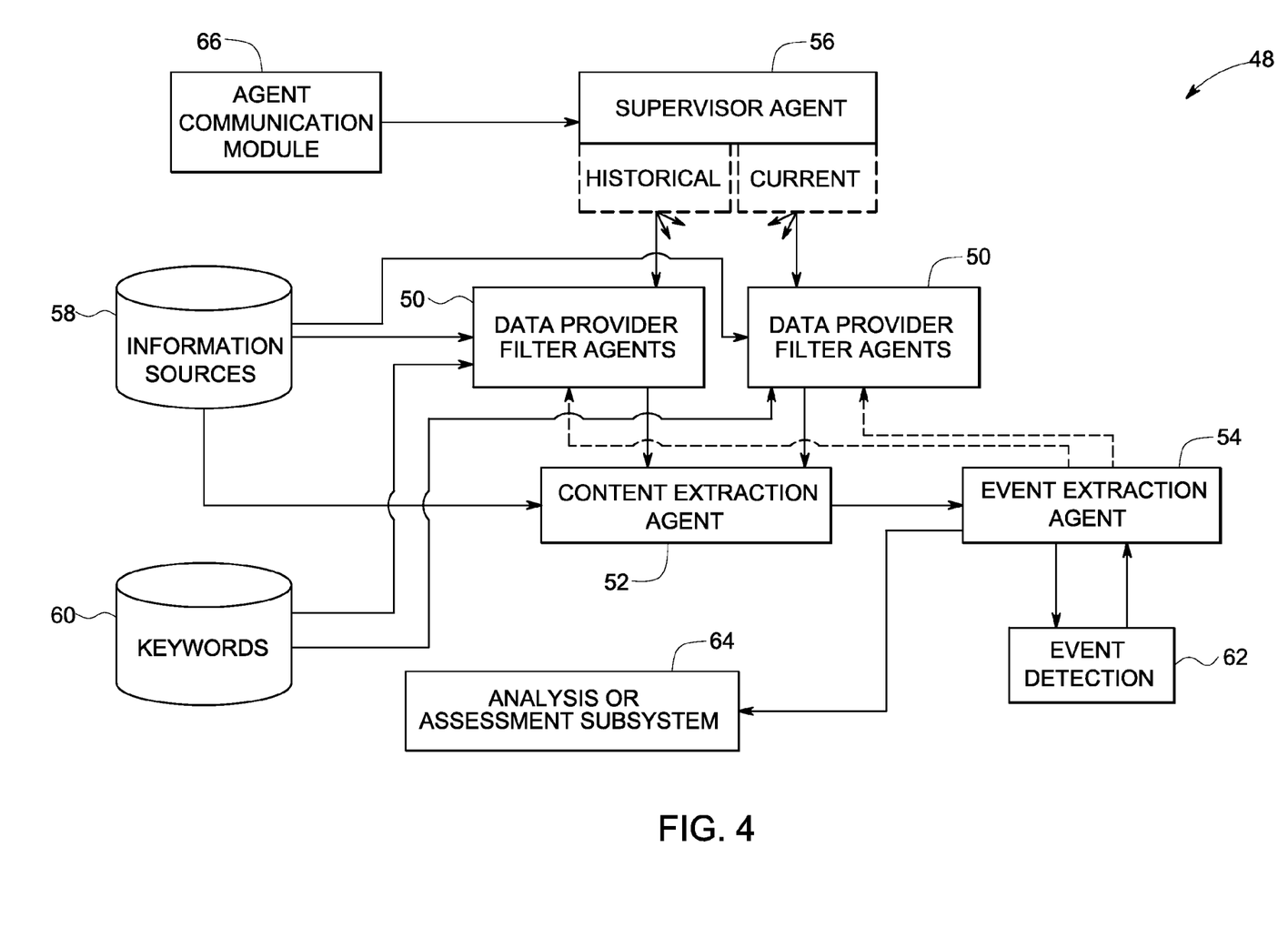
FIG. 4 depicts the functional architecture of a multi-agent information collection system for automatically acquiring information from one or more information sources in accordance with aspects of the present technique.

As will be appreciated by one skilled in the art, in certain embodiments, the information acquisition and analysis system, such as computer system 10, may be based on a multi-agent model in accordance with aspects of the present technique. FIG. 4 illustrates a functional architecture of a multi-agent information collection system 48 for automatically acquiring information from diverse information sources in accordance with aspects of the present technique. The multi-agent information collection system 48 utilizes intelligent, autonomous agents to identify news articles of potential interest from multiple data providers, to extract the full content of those articles for processing, and to extract events of interest from those articles, which are then evaluated for their uniqueness and relevance, and potentially stored as a consequence. Generally, 'agent' is used herein to refer to an 'autonomous and adaptable code fragment'. The intelligent autonomous agents of system 48 may be typically classified into four classes of agents—data provider filter agents 50, content extraction agents 52, event extraction agents 54, and supervisor agents 56.

The data provider filter agents 50 are associated with the one or more information sources 58 and are responsible for searching the desired information, such as articles of interest, within the respective information sources 58 based on the assessment of the one or more information sources 58 as described above. Each of the data provider filter agents 50 searches for the desired information by proactively identifying articles of interest within the respective information source 58 or by identifying articles within the respective information source 58 in response to a request by a user. Additionally, data provider filter agents 50 search for the desired information by querying the respective information source 58 and selecting potentially relevant articles. These agents 50 may use a set of keywords 60 to search for and evaluate whether the headlines and/or article synopses contain potentially relevant information. It should be noted that each agent keeps a list of keywords for each type of data it might have to search for within its particular source. The keywords may be generated by a user or may be automatically generated from a corpus of articles with known events. The keywords help the agents to locate news articles containing events that they were not aware of in advance, but which are similar to events that they already know about. A keyword list can be used to retrieve relevant information in two ways, depending on the functionality provided by a particular information source 58. If the information source 58 provides a query interface to submit keywords to retrieve information containing those keywords, the keyword list can be sent to the query interface by a computer program and relevant information can thus be retrieved. Alternatively, if the information source does not provide a query interface, all available information in that source can be retrieved by the means provided by the information source, and the keyword list can be used to narrow down the results to only the potentially relevant ones.

It should be noted that, over time, the data provider filter agents 50 may typically evolve into historical data provider filter agents and/or current data provider filter agents based on the type of information source 58 they are associated with and based on the time frame of information they typically search for. For example, the historical data provider filter agents are responsible for searching historical news related to a specified business entity or industry when they receive a message from supervisor agent 56 to collect the same. On the other hand, the current data provider filter agents maintain a list of companies that are searched for at regular intervals, proactively identifies information of interest on those companies or industries, and notifies the analyst or analysis subsystem about the information. Additionally, the current data provider filter agents receive messages from the supervisor agent to add or remove companies from a watch list of companies they are constantly attempting to collect new information on. Thus, the multi-agent information collection system immediately responds to requests for historical information. For current events, the companies are added to a watch list and current news providers are searched for information of interest on those companies at a regular interval.

In one embodiment, a data provider agent or set of data provider agents 50 are associated with each information source 58 and are motivated to learn to most effectively query that information source and filter out potentially relevant articles. These agents 50 improve their querying capability based on feedback received from the event extraction agents 54. If the articles recommended by data provider agents 50 are valuable (i.e., contain relevant information), the agents 50 are encouraged or rewarded to continue with their decision mechanism. If the articles do not contain relevant information, the agents 50 are encouraged to alter their decision mechanisms to improve their performance.

The content extraction agent 52 is adapted to acquire a plurality of articles containing the desired information from the one or more information sources based on the search. The content extraction agent 52 downloads and extracts the full article from a URL on receiving a message from the data provider filter agents 50 to download an article. In one embodiment, the content extraction agent 52 acquires the plurality of articles by downloading web pages containing articles and learning how to most effectively extract the article content out of the HTML (Hyper Text Markup Language) source pages. HTML source pages generally have a certain repetitive structure to present a set of information. These sources pages may include a target news article with surrounding sidebars, headers, and footers containing graphics, advertisements, links to other content, and other material irrelevant to the target news article. However, the structure of the HTML source page is repetitive from one article to another article on the same website. The agents encounter several such pages in their lifetime and can learn to recognize the repetitive patterns in the HTML source content. As will be appreciated by one skilled in the art, a grammar can be devised to match such patterns. The agent learns the most effective grammar to employ in extracting the repetitive information from the HTML source page based on all the past patterns it encounters in the previous source pages.

The event extraction agent 54 is responsible for identifying any relevant events (such as business events of interest) within the acquired information or articles and extracting them from the acquired information or article. The events are identified or detected via an event detection module 62. It should be noted that the one or more business events of interest may include, but are not limited to, a government regulatory change, a government investigation, a management transition (such as a CEO or CFO change), an auditor change, a debt restructuring, a loss of several significant customers, a merger or acquisition, or another event impacting a business entity or industry. The event extraction agent 54 may then evaluate a confidence level of the event, uniqueness of the event, and/or contradiction of the event with respect to other events and store the relevant and unique events based on the evaluation. For example, the event extraction agent 54 is responsible for determining if any identified events are worth storing by considering if the event is a duplicate, of low or high confidence, or if other events contradict the one under consideration. The one or more relevant events stored by the event extraction agent 54 may then be analyzed via an analysis or an assessment subsystem 64 to assess the health of the business entity. In one embodiment, the one or more business events of interest may be analyzed to detect an anomaly via any known anomaly detection technique.

Additionally, the event extraction agent 54 gives feedback to the data provider filter agents 50 as described previously. It should be noted that the feedback might include feedback about the relevancy of the information from various users of the information. Typically, the event extraction agent 54 is given feedback from two sources—the end (human) user of the information, and the automated systems that use the information, such as the information fusion system. Both the human and automated users of the data may give feedback to the event extraction agent indicating if the extracted information is relevant or irrelevant. Each data user (human or automated) is able to set individual precision and recall targets, so the system can simultaneously support users with different needs. As will be appreciated by one skilled in the art, the event extraction agent extracts the one or more relevant events from the plurality of articles in a standard format.

The supervisor agent 56 acts as the interface between the agent system and the outside world via an agent communication module 66. It is initialized with a list of all of the available historical and current data provider filter agents 50 and is responsible for feeding search requests to the data provider filter agents 50 by providing them with search parameters. It receives a message from an external analysis or assessment subsystem (e.g., anomaly detection module) specifying the specific search parameters. The parameters generally include the business entity and/or industry, type of information, and time period of information (e.g. if this is for current or historical news) to be searched. If current news is required the parameters may also include whether a company is being added or removed from the watch list. Thus, the supervisor agent informs the data provider filter agents about the companies to search for, type of events that are of interest, and whether historical or current events (or both) are of interest. The supervisor agent is also responsible for selecting which information source to use if there are multiple information sources capable of providing essentially the same information. This decision is based on the cost and the coverage of the respective information sources for each event type and company size. For example, if the company is a large publicly traded company, a CEO change will likely be covered by a source such as the Wall Street Journal. However, for smaller companies, Factiva may be the only source carrying such information. If the lender has high exposure with the company, they are likely to invest money for the Factiva product whereas for companies with lower exposure, they may only be willing to utilize free sources. If the company is large, it makes no sense to use the more expensive Factiva solution when the less expensive Wall Street Journal will provide the information.

As will be appreciated by one skilled in the art, a multi-agent information collection system 48 may become a part of any business operation that requires information from diverse information sources and learning capabilities to improve information retrieval over time. Further, the multi-agent information collection system learns how to operate more effectively over time, thereby increasing its positive retrieval rate while reducing the amount of data processed unnecessarily. The system is also capable of evolving to improve its retrieval rate as the environment changes by using information gathered by agents to help other agents in the system become more effective. Moreover, the use of a layered architecture to access heterogeneous data sources in a transparent way and to learn profiles for each source increases the efficiency of data acquisition. The layered structure effectively hides the details of the information sources from the majority of the system. Only the data provider filter agents know the differences between the information sources while being transparent to the remaining components. Thus, as sources are added and removed, only a small part of the system must change.

As will be appreciated by one skilled in the art, in many cases, it is imprudent to purchase and process all of the data from all sources since the diversity of the information required and cost of the information providers makes the data collection costly and inefficient. Thus, as stated above, an assessment means must be established to collect, purchase, and process data based on the potential significance of the information to the business, the strengths/weaknesses of each data source and/or data provider, the likelihood of each data source and/or data provider to contain the information, the purchase options available from each data source and/or data provider, such as yearly or 'pay-by-the-use' licenses, and so forth. The technique described herein provides a means for automating the collection of information from diverse data sources in a manner that considers the coverage of available data providers and data sources and the likelihood that the data will provide additional information to the overall decisioning process. This deliberative learning model drives the system to collect the most valuable and most easily accessible data first. The system learns to collect data with improved precision by using the best providers for each type of targeted data element, while minimizing the cost. The technique described herein enables the multi-agent system described above to acquire the data in an efficient and cost effective manner.

Figure 5:
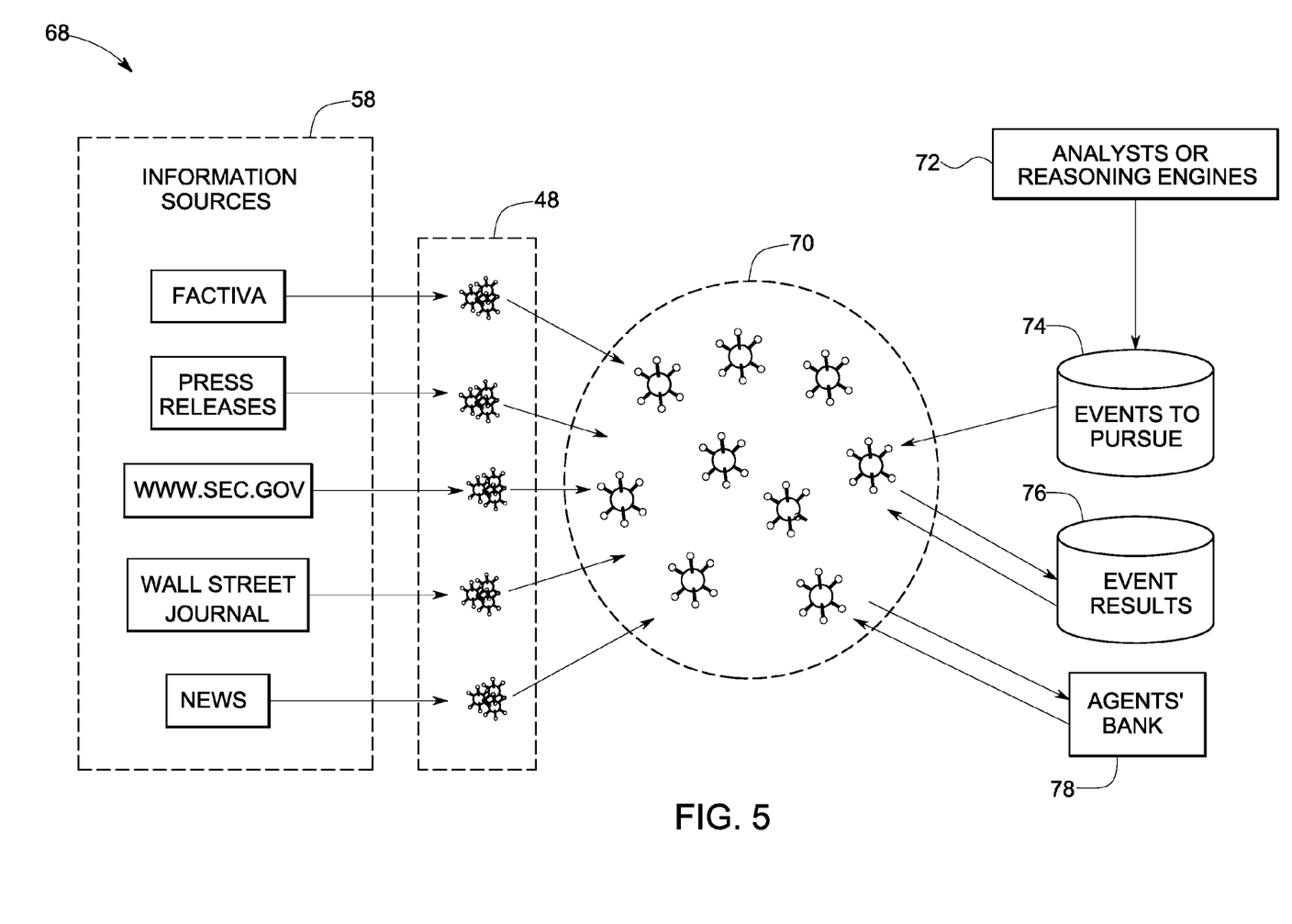
FIG. 5 is a schematic diagram of a deliberative learning system for enabling the multi-agent information collection system of FIG. 4 to acquire information in an efficient and cost effective manner in accordance with aspects of the present technique.

FIG. 5 illustrates a schematic diagram of a deliberative learning system 68 for enabling the multi-agent information collection system 48 described above to acquire the desired information from one or more information sources 58 in an efficient and cost effective manner in accordance with aspects of the present technique. As illustrated, the deliberative learning system 68 utilizes a network of intelligent autonomous agents (deliberative learning agents) 70 to extract a maximum amount of information from multiple data providers 58 while minimizing the cost of the information collected. The agents 70 in the system 68 are motivated to learn to use the most cost effective means to collect each type of event (i.e., to specialize in the type of information they collect and the means they use to collect them) as will be described in greater detail herein below.

Analysts and/or automated reasoning engines 72 used to assess company-level risk can request information from the deliberative learning agents 70 by submitting information requests in an "events-to-pursue" database 74. These information requests contain metadata about the information the reasoning engine 72 desires in order to effectively assess the risk of the company based upon the likelihood of a potential problem area in the company's financial behavior. The metadata contained in the information request includes: the name of a company for which the information is needed, along with an approximation of the company's size, the type of information needed (such as the type of event the reasoning engine wishes to search for), and the value of the information to the overall decisioning process in the form of a high, medium, or low classification.

These information requests are handled by the deliberative learning agents 70. As the reasoning engines 72 monitors the risk of companies in the portfolio, they continually add information requests to be fulfilled by the deliberative learning agents 70 in the events to pursue database 74. The multi-agent information collection system 48 searches information sources, purchases relevant articles, and extracts the requested information from the articles. As requests are satisfied the results (relevant events) are stored in an event results database 76. The agents 70 then determines uniqueness and/or relevance of the events and notifies each analyst or reasoning engine 72 that additional information is available so they can reevaluate the health of the company in light of the new information. This provides a dynamic system by which the reasoning engine 72, working together with the deliberative learning agents 70, continues to 'hunt' for more information about the companies based on the information it already knows as well as any suspicions based on the existing information.

Each event request placed into the system 68 has an associated 'utility', representing how valuable the request is to the analyst's business for making an effective analysis or assessment. Events that could completely change a deal are of high utility, whereas events that would have little or no impact on a business decision are of little utility. This utility is what the agent could earn as a reward if they find the event. Similarly, when agents utilize a data source they may have to pay an access cost for that provider. The deliberative learning agent 70 responds to requests from the reasoning engine 72 by satisfying them to the best of its ability considering the potential value of the information (as defined by the analyst or reasoning engine), the likelihood of the information to be contained by each information provider 58, and the potential cost to acquire the information from the information provider 58. The deliberative learning agent 70 is provided with information about each information source, including its cost per access, and its likelihood to contain certain information elements for a given company size. A subject matter expert can provide this information explicitly to the system a-priori, by manually searching for several events known to have occurred to several small, medium, and large companies, and measuring how many of these events were successfully found in each information source for each given company size. Similarly, the subject matter expert can provide pricing information to the agents. Alternatively, the agents have the ability to extract and learn this information from the information sources directly. This information is automatically updated over time by the agent, to reflect the agents' changing experiences with the information sources. That is, the agents continuously update their knowledge to reflect the agents' experiences with the information sources.

The agents 70 are motivated by incorporating a notion of profit. Each agent 70 tries to pursue events that will maximize their profit (reward minus cost). Thus, the agents 70 flock towards the event types and data sources that provide them the most amount of reward while costing the least for data access. Initially, a training period provides each agent with experiences that allow it to experiment with several different types of events and data options. Once the training period has ended, each agent uses its unique experience to decide which information requests to pursue and which data sources to use to attempt to satisfy those requests. Each agent chooses an information request it wishes to satisfy, based on which type of information requests have proven to be the most profitable in its past experience. The agent then decides on the data source to use based upon which data providers have been most effective at satisfying that type of request in a most profitable manner, again based on past experience. If the agent is able to find the information, or prove that the information doesn't exist (i.e. prove that a CEO change did not happen by searching enough sources such that the system 68 is convinced it did not happen), the agent can collect a reward for its work. The agent earns a reward proportional to the worth of the event—the more the information is worth, the higher the reward. The agent's profit for the event is the amount of the reward minus the amount that the agent spent to purchase the information from the information sources. If the agent does not find the information or does not try enough data sources to convince the system that the information does not exist (i.e. didn't happen), than the agent will not receive any reward. Further, the system 68 provides the agent with a reward for disproving an event, though less than the reward for proving the event did occur. The system 68 is provided with a disproval threshold that it must exceed to satisfactorily disprove an event. The agent 70 calculates the probability that the event would have been found if it had occurred using the known likelihood that an information source would contain an event of this type. If the agent determines that this probability is greater than the disproval threshold, the system 68 is satisfied that the agent disproved the event. It may take one search or more than one search before this probability exceeds the disproval threshold.

A bank 78 maintains an account for each agent, gives agents rewards, and collects data source access fees. If an agent's bank balance goes below zero, the agent is deactivated or destroyed. Agents with the highest balances are allowed to select events first, allowing them the best opportunity to develop expertise in very profitable types of events. Agents with the least profit pick last, so they have fewer choices in events to pursue. The agents are rewarded for finding events by being rewarded based on the utility of the event. These rewards, less the incremental costs for any searches, are added to the agent's bank account and are then used to help the agent learn.

This learning behavior on the part of the agent allows it to learn which information sources prove most useful in collecting certain information requests for certain company sizes; thereby allowing the agent to become more and more profitable. As will be appreciated by one skilled in the art, natural selection ensures the survival of the fittest in a population when the least effective agents are eliminated. Therefore, as the individual agents learn, both the individuals and the population get smarter in retrieving information with minimal cost and in adapting to changes in the environment. Individual agent learning allows the population in its entirety to converge to an optimal behavior. Some agents will learn from their experience to specialize on low worth information requests by utilizing only free sources. If they find the event, they get a reward. If they cannot find the event but try only free sources, they are not rewarded, but they are also not punished. Other agents learn to maximize their profit by going after the high-worth information requests and spending their money to use the source that is the most likely to have the information. If two sources are equally likely, the agent's utility function will motivate it to use the most inexpensive one. Any agent that cannot identify a profitable strategy will be destroyed over time. This learning behavior makes the autonomous deliberative learning agents intelligent and economic.

This experimentation to learn which data sources prove most useful in collecting information for given company sizes will evolve a system that uses the best sources to get the most useful information in the most cost-efficient manner. Such a system will improve or optimize a solution to spend money for high-worth, hard-to-find information requests from the least expensive source likely to have the information, while spending little or no money to track down lower-worth information requests. By utilizing intelligent agents to hunt for information, the system is able to learn to make improved or optimal use of the information sources and pricing strategies available, resulting in considerably less expense than a bulk purchase and assimilation of many expensive data products. Further, as the strengths and weaknesses of the data sources and data providers change over time, this information is learned by the deliberative learning system 68 and is incorporated into the behavior of the individual agents. As use of particular data providers becomes less profitable, these providers are abandoned.

This system can be easily extended to allow multiple agents to satisfy the same event request across multiple sources in order to increase confidence that the information is correct. Further, the system can utilize 'human agents' for those data sources and/or providers that require manual intervention in order to acquire the desired information. In the event that a 'human agent' is included in the system, the deliberative learning system ensures that 'human agents' are used when they are most useful and not for those information requests where the information may be acquired efficiently and cost effectively by an autonomous agent.

As will be appreciated by one skilled in the art, the deliberative learning system 68, like the multi-agent information collection system 48, may become a part of any business operation that requires information from diverse information sources, some of which have a cost associated with use, where the business desires to spend money on information based on its expected value to the business. Additionally, the use of autonomous and intelligent deliberative learning agents (also referred to as economic agents) enables improved or optimal information collection on demand, across multiple data providers while considering multiple conflicting objectives such as maximizing information detection, minimizing cost, and so forth.

As will be appreciated by one skilled in the art, the information acquisition techniques, as described in the embodiments discussed above, enable an efficient, autonomous, and cost effective collection of information from diverse information sources into a consistent and useful format for the information recipient. Further, the technique introduces an integrated approach to information acquisition, thereby bringing consistency to the data collection processes while allowing for each business's preferences to be maintained. Moreover, the technique, as described in the various embodiments discussed above, improves the information gathering capabilities of each business while reducing the overall cost for acquiring the data. The technique allows for collecting new information and filtering out irrelevant or already discovered information. Additionally, the technique allows for the collection of targeted historical information on demand.

It should be noted that the techniques described in the various embodiments discussed above can be easily generalized, and may therefore be applied in any field where a high volume of information needs to be acquired from diverse information sources. For example, the techniques described above may be applied to evaluate various datasets such as financial datasets, demographic datasets, behavioral datasets or census datasets. The focus of collecting financial information on companies only provides an example of the benefit of the invention described above, and is not meant to limit its broader applicability.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A multi-agent system for automatically acquiring desired information from one or more information sources, the system comprising:
   an input device configured for inputting data indicative of a desired information;
   a processor communicatively coupled to the input device and configured to receive the input data; the processor comprising:
   a plurality of data provider filter agents associated with the one or more information sources and configured to search for the desired information within the respective information sources based on an assessment of the one or more information sources; wherein the assessment of the one or more information sources comprises: assessing at least one of a potential value of the desired information, a potential cost to acquire the desired information from the one or more information sources, or a combination thereof, and a probability of the desired information to be contained in each of the one or more information sources; and
   a content extraction agent configured to acquire a plurality of articles containing the desired information from the one or more information sources based on the search;
   an output device communicatively coupled to the processor and configured for outputting the plurality of articles containing the desired information.

* * * * *